United States Patent Office 3,185,689
Patented May 25, 1965

3,185,689
3-O-TOLYL-4-(3H)-PYRIMIDONES
Heinrich Ruschig, Bad Soden, Taunus, Karl Schmitt and Leopold Ther, Frankfurt am Main, and Wilhelm Meixner, Hofheim, Taunus, Germany, assignors to Farbwerke Hoechst Aktiengesellschaft vormals Meister Lucius & Brüning, Frankfurt am Main, Germany
No Drawing. Filed Aug. 6, 1962, Ser. No. 214,826
Claims priority, application Germany, Aug. 16, 1961, F 34,698
2 Claims. (Cl. 260—251)

We have found that oxopyrimidines of the general formula

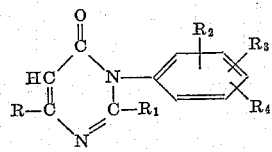
(I)

in which R represents an alkyl radical having from 1 to 4 carbon atoms which may be interrupted by oxygen or sulfur, a low molecular alkenyl radical, a phenyl radical or a low molecular phenalkyl radical; $R_1$ represents an alkyl radical having from 1 to 6 carbon atoms which may be interrupted by oxygen or sulfur or may be substituted by a carbalkoxy group, a low molecular alkenyl radical, a phenyl radical or a low molecular phenalkyl radical; $R_2$ represents a low molecular alkyl radical, a low molecular alkyl radical substituted by halogen, a low molecular alkoxy, piperidino-alkoxy, alkenoxy, alkyl-mercapto and acylamino radical, an amino radical, a low molecular alkylamino, carbalkoxy, acyl, acyloxy and phenalkoxy radical, a phenyloxy radical, a halogen atom, the trifluoromethyl group or the hydroxy group; and $R_3$ and $R_4$ each represent hydrogen, a low molecular alkyl radical, a low molecular alkyl radical substituted by halogen, a low molecular alkoxy, piperidino-alkoxy, alkenoxy, alkyl-mercapto and acylamino radical, an amino radical, a low molecular alkylamino, carbalkoxy, acyl, acyloxy and phenalkoxy radical, a phenyloxy radical, a halogen atom, the trifluoromethyl group or the hydroxy group, or the salts of such oxopyrimidines can be prepared by slitting off water or hydrogen sulfide is known manner from the β-acylamino alkenic acid anilides of the general formula

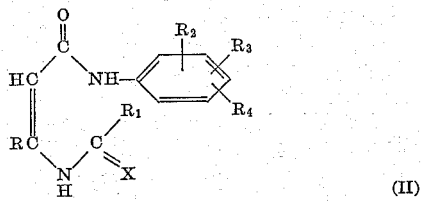
(II)

in which R, $R_1$, $R_2$, $R_3$ and $R_4$ have the meanings given above and X represents oxygen or sulfur, or by reacting in known manner β-amino alkenic acid esters of the general formula

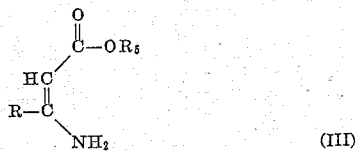
(III)

in which $R_5$ represents an aryl or aralkyl or preferably low molecular alkyl radical and R has the meaning given above, with imide-halides of the general formula

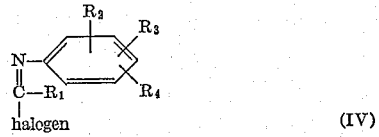
(IV)

in which $R_1$, $R_2$, $R_3$ and $R_4$ have the meanings given above; and if desired, converting the reaction products so obtained into the corresponding salts by means of organic or inorganic acids. As starting substances for the process of the present invention there are mentioned the compounds corresponding to the formulae II, III and IV in which the radicals R, $R_1$

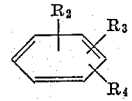

have the following meanings.

R: methyl, ethyl, propyl, isopropyl, butyl, isobutyl, sec. butyl, allyl, crotyl, 2-methoxyethyl, ethoxymethyl, 3-methoxypropyl, 2-ethylmercaptoethyl, benzyl and phenyl;

$R_1$: methyl, ethyl, propyl, isopropyl, butyl, isobutyl, sec. butyl, n-pentyl, isoamyl, n-hexyl, allyl, crotyl, propenyl, 2-methylpropenyl, methoxymethyl, 2-methoxyethyl, ethoxymethyl, isopropoxymethyl, n-butoxy-methyl, 3-methoxypropyl, 2-ethylmercaptoethyl, carbethoxyethyl, carbisopropoxyethyl, benzyl and phenyl, and

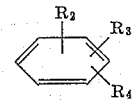

each: o-, m-, p-ethylphenyl, o-, m-, p-propylphenyl, o-, m-, p-isopropylphenyl, 2,4-dimethylphenyl, 2,4,6-trimethylphenyl, 3-trifluoromethylphenyl, o-, m-, p-hydroxyphenyl, o-, m-, p-aminophenyl, o-, m-, p-dimethylaminophenyl, o-, m-, p-methoxy and ethoxyphenyl, 4-allyloxyphenyl, 4-(piperidino-alkoxy)-phenyl, o-, m-, p-chlorophenyl, 3-fluorophenyl, 2-chloro-4-ethoxyphenyl, 2-methyl-6-chlorophenyl, 2-methyl-4-methoxyphenyl, 3,4,5-trimethoxyphenyl, 4-phenoxyphenyl, 2-benzyloxyphenyl, 4-benzyloxyphenyl, 3-methylmercapophenyl, 4-acetaminophenyl, 4-crotonylamino-phenyl, 4-carbethoxyphenyl, 3-hydroxy-4-carbethoxyphenyl, p-acetylphenyl, p-N,N-diacetylamino-phenyl.

As β-acylamino-alkenic acid anilides there may be mentioned for example:

β-acetamino-crotonic acid-o-toluidide,
β-thioacetamino-crotonic acid-o-toluidide,
β-thiobenzamino-crotonic acid-o-toluidide,
β-acetamino-crotonic acid-(2,6-dimethyl-anilide),
3-propionylamino-pentenic-(2)-acid-(1)-o-toluidide,
3-butyrylamino-pentenic-(2)-acid-(1)-(p-tert.butyl-anilide),
3-butyrylamino-hexenic-(2)-acid-(1)-o-toluidide,
3-(β-methyl-crotonyl-amino)-heptenic-(2)-acid-(1)-(o-ethyl-anilide),
3-hexanoylamino-hexenic-(2)-acid-(1)-(2,4,6-trimethyl-anilide),
β-acetamino-crotonic acid-(p-amino-anilide), β-propionylamino-crotonic acid-(p-dimethylamino-anilide),
3-(2- or 4-methylpentanoyl-amino)-hexenic-(2)-acid-(1)-o-toluidide,
3-(β-n-butylacrylamino)-pentenic-(2)-acid-(1)-(m-tri-fluoromethyl-anilide), as β-amino-alkenic acid esters there are mentioned for example, β-amino-crotonic acid methyl ester,
β-amino-crotonic acid ethyl ester,
β-amino-crotonic acid benzyl ester,
β-amino-crotonic acid phenyl ester,
β-ethyl-β-amino-acrylic acid methyl ester,
β-ethyl-β-amino-acrylic acid ethyl ester,
β-n-propyl-β-amino-acrylic acid methyl ester,
β-n-butyl-β-amino-acrylic acid methyl ester and as imide halides there enter into consideration:

N-(m-chlorophenyl)-acetimide-chloride,
N-(m-chlorophenyl)-acetimide-bromide,
N-(m-trifluoromethyl-phenyl)-acetimide-chloride,
N-(2,3 or 4-methylphenyl)-acetimide-chloride,
N-(2,3 or 4-methoxyphenyl)-acetimide-chloride,
N-(m-chlorophenyl)-propionimide-chloride,
N-(2-methylphenyl)-butyrimide-chloride and
N-(2-methylphenyl)-benzimide-chloride.

The process for the preparation of the products of the present invention can be varied on a wide scale. If the process of the present invention is started with the β-acylamino-alkenic acid anilides of the Formula II as starting substances, the desired products are obtained by ring closure reaction which is performed under dehydration. This reaction is principally known. It can be carried out by means of reagents which favour dehydration, such as for example, acid anhydrides, acid halides, free acids and bases, or it can be performed by heating the reaction mixture, if desired in a solvent, such as benzene, toluene, chlorobenzene, tetrachlorethane. It is—of course—not necessary to start from isolated β-acylamino-alkenic acid anilides, the dehydration can rather be effected simultaneously or subsequently in the reaction mixture in which the anilides are formed. When operating in the presence of the above-mentioned dehydrating agents, the reaction can be carried out, for example at temperatures ranging from 50 to 150° C., whereas otherwise it will be advantageous to use temperatures above 150° C., for example 180 to 220° C.

Starting from β-thioacylamino-alkenic acid anilide there are obtained the compounds of the Formula I by the splitting off of hydrogen sulfide. This splitting off can be performed for example, by means of the salts of heavy metals such as mercury acetate, copper acetate or silver nitrate.

The β-amino-alkenic acid derivatives which are derived from the β-acylamino-alkenic acid anilides can be prepared in known manner, for example from the corresponding β-oxo-carboxylic acid derivatives by the reaction with ammonia and can subsequently be acylated in known manner.

The reaction of the β-amino-alkenic acid derivatives of the Formula III with imide-halides of the Formula IV is also a method of operation known per se. The reaction can be performed without solvent or in the presence of an inert solvent, such as for example, ether, methylene-chloride, chloroform, carbon tetrachloride. The reaction temperatures to be applied depend on the reactivity of the imide-halide used. Generally, imide-chlorides are used, but it is also possible to use imide-bromides. In some cases the reaction can already be carried out at temperatures below 20° C., in other cases it is advantageous—in view of an adequate reaction period—to operate at moderately elevated temperatures, for example at the boiling temperature of the solvent, or sometimes at temperatures above 150° C., for example in the range of 150 to 220° C. The imide-chlorides are prepared in known manner, advantageously by re-arranging the corresponding ketoximes with phosphorus pentachloride and can be reacted directly as crude products with the β-amino-alkenic acid esters which are obtained, for example, by the reaction of β-oxo-carboxylic acid esters with ammonia.

The compounds obtained by the process of the present invention have basic properties and can easily be separated from the reaction mixture in usual manner, for example, by means of aqueous acids. Since, in general, the salts, for example those of mineral acids or sulfo acids crystallize well, this method offers a convenient possibility for purifying the products of the present invention.

The compounds obtained by the process of the present invention possess valuable pharmacological properties. They are particularly characterized by their narcotic, hypnotic and sedative activity. They, furthermore, possess a strong analgesic, antipyretic and antiphlogistic activity. Thus, the 2,6-dipropyl-3-(o-methyl-phenyl)-4-oxo-3,4-dihydro-pyrimidine-hydrochloride, when intravenously administered to dogs in a dose of 10 mg./kg. of body weight caused a calm and deep narcosis lasting about 1 hour which enabled difficult operations to be performed.

On using the commercial narcotics, the same narcosis is only attained with the administration of considerably larger doses. For example, 30–40 mg./kg. of 5-ethyl-5-(1'-methyl-butyl)-2-thio-barbituric acid or 5-($\Delta^{1,2}$-cyclo-hexenyl)-5-methyl-N-methyl barbituric acid, which belong to the strongest and most conventional narcotics, must be administered to dogs in order to attain the above-mentioned narcosis lasting 1 hour, but in this case there exists already the risk of a dangerous respiratory paralysis. Considering the fact that in mice the lethal dose 50 for the products of the present invention is 250 mg./kg. in the case of intravenous injection, whereas the lethal dose 50 for the above-mentioned commercial products is 80–140 mg./kg. in the case of intravenous injection, it has been proved that the new compounds have a many times larger therapeutic application range, which means an important progress in narcotization technique.

It is a further advantage of the new compounds that they are also excellently active when administered orally, and that on intravenous injection no irritation of the veins is provoked, since the solutions—contrary to most of the narcotics—do not possess an alkaline pH value and can be prepared without solubilizers.

In view of their use as medicaments the salts of the new compounds are of particular importance. They are soluble in water, if necessary in the presence of a usual solubilizer and can be administered orally or parenterally, if desired in admixture with pharmaceutically suitable auxiliary substances and carriers. Since the free bases are in general sparingly soluble in water, oral administration is preferred. In case of oral application the form of tablets or dragees is preferred, into which the products obtained by the process of the present invention are incorporated as active ingredients together with the usual carriers such as lactose, starch, tragacanth and magnesium stearate.

The following examples serve to illustrate the invention, but they are not intended to limit it thereto:

*Example 1*

(a) A mixture of 100 grams of 3-amino-hexenic-(2)-acid-(1)-o-toluidide, melting point 103° C. and 200 cc. of butyric acid anhydride was heated on the oil bath for 2 hours at 170° C. The excess butyric acid anhydride was then distilled off under a pressure of about 25 mm. of mercury, the residue was dissolved in isopropanol and mixed with isopropanolic hydrochloric acid. There were obtained 96 grams of 2,6-dipropyl-3-o-tolyl-3,4-dihydro-pyrimidone-(4)-hydrochloride melting at 172° C. (from acetone).

(b) 100 grams of β-oxo-caproic acid-o-toluidide, melting point 64 to 66° C., were kept for 36 hours at room temperature in 400 cc. of a solution of ammonia of 25% strength in methanol. The solvent was then distilled off in a water-jet vacuum, the residue was mixed with 300 cc. of benzene and again concentrated by evaporation. The further reaction of the so obtained crude 3-amino-hexenic-(2)-acid-(1)-o-toluidide was carried out according to the working method described in Example 1a. There were obtained 60 grams of 2,6-dipropyl-3-o-tolyl-3,4-dihydro-pyrimidone-(4)-hydrochloride melting at 172° C.

The following compounds were prepared in an analogous manner:

2-propyl-6-methyl - 3 - o - tolyl-3,4-dihydro-pyrimidone-(4)-hydrochloride, melting point 177° C.; melting point of the free base 88° C.

2,6-dimethyl - 3 - (p-carbethoxy-phenyl)-3,4-dihydro-pyrimidone-(4)-hydrochloride, melting point 280° C. (decomposition).

2-methyl - 6 - propyl-3-(2,6-dimethyl-phenyl)-3,4-dihydro-pyrimidone-(4)-hydrochloride, melting point 128° C. (decomposition).

2-phenyl - 6 - methyl-3-o-tolyl - 3,4 - dihydro-pyrimidone-(4)-hydrochloride, melting point 100° C.

2,6-dimethyl - 3 - (m - methylmercapto-phenyl)-3,4-dihydro-pyrimidone-(4)-hydrochloride, melting point 262° C. (decomposition).

2,6-dimethyl - 3 - (2,4 - dimethyl-phenyl)-3,4-dihydro-pyrimidone-(4)-hydrochloride, melting point 276° C. (decomposition); melting point of the free base 114° C.

2,6-dimethyl - 3 - (o-methoxy-phenyl)-3,4-dihydro-pyrimidone-(4)-hydrochloride, melting point 248° C. (decomposition); melting point of the free base 136° C.

2-methyl - 6 - phenyl-3-o-tolyl - 3,4 - dihydro-pyrimidone-(4)-hydrochloride, melting point 218° C.

2-phenyl - 6 - propyl-3-o-tolyl-3,4-dihydropyrimidone-(4), melting point 106° C.

2-methyl - 6 - propyl-3-(2-chloro - 6 - methyl-phenyl)-3,4-dihydro-pyrimidone-(4)-hydrochloride, melting point 218° C.

2-methyl - 6 - propyl-3-(2,4,6-trimethyl-phenyl)-3,4-dihydro-pyrimidone-(4)-hydrochloride, melting point 228° C. (decomposition).

2,6 - dimethyl - 3 - (p-ethoxy-phenyl)-3,4-dihydro-pyrimidone-(4)-hydrochloride, melting point 287° C. (decomposition).

2-n-pentyl-6-propyl - 3 - o - tolyl-3,4-dihydro-pyrimidone-(4)-hydrochloride, melting point 173° C.

2-ethyl - 6 - propyl-3-o-tolyl-3,4-dihydro-pyrimidone-(4)-hydrochloride, melting point 197° C.

2-methyl - 6 - propyl-3-(m - methylmercapto-phenyl)-3,4-dihydro-pyrimidone-(4)-hydrochloride, melting point 248° C. (decomposition).

2-methyl - 6 - propyl-3-(m-trifluoromethyl-phenyl)-3,4-dihydro-pyrimidone-(4)-hydrochloride, melting point 245° C.

2-methyl-6-benzyl - 3 - o - tolyl-3,4-dihydro-pyrimidone-(4)-hydrochloride, melting point 208° C.

2-methoxy-methyl - 6 - propyl-3-o-tolyl-3,4-dihydro-pyrimidone-(4)-hydrochloride, melting point 297° C. (from isopropanol).

2,6-dimethyl-3-[p-(β-piperidino-ethoxy)-phenyl]-3,4-dihydro-pyrimidone-(4)-bishydrochloride, melting point 279° C. (from ethanol/water).

2,6-dimethyl-3-(p-hydroxy-phenyl)-3,4-dihydro-pyrimidone-(4)-hydrochloride, melting point 229° C. (from methanol).

2-methyl-6-propyl-3-(p-phenoxy-phenyl)-3,4-dihydro-pyrimidone-(4)-hydrochloride, melting point 225° C. (from alcohol).

2,6-dimethyl-3-(p-benzyloxy-phenyl)-3,4-dihydro-pyrimidone-(4)-hydrochloride, melting point 281° C. (from isopropanol).

2-methyl-6-propyl-3-(3-hydroxy-4-carbethoxy-phenyl)-3,4-dihydro-pyrimidone-(4)-hydrochloride, melting point 235° C. (from alcohol).

2-methyl-6-propyl-3-(p-isopropyl-phenyl)-3,4-dihydro-pyrimidone-(4)-hydrochloride, melting point 211° C. (with decomposition) (from isopropanol).

2,6-dimethyl-3-(p-diacetylamino-phenyl)-3,4-dihydro-pyrimidone-(4)-hydrochloride, melting point 228° C. (with decomposition) (from alcohol).

2-methyl-6-propyl-3-(p-acetyl-phenyl)-3,4-dihydro-pyrimidone-(4)-hydrochloride, melting point 277° C. (with decomposition) (from alcohol).

2-[β-carbisopropoxy-ethyl]-6-propyl-3-o-tolyl-3,4-dihydro-pyrimidone-(4)-hydrochloride, melting point 178° C. (from isopropanol).

2-isopropyl-6-propyl-3-o-tolyl-3,4-dihydro-pyrimidone-(4)-hydrochloride, melting point 169° C. (from isopropanol).

2-n-butoxymethyl-6-propyl-3-o-tolyl-3,4-dihydro-pyrimidone-(4)-hydrochloride, melting point 145° C. (from acetone).

2-ethoxymethyl-6-propyl-3-o-tolyl-3,4-dihydro-pyrimidone-(4)-hydrochloride, melting point 191° C. (from isopropanol).

2-isopropoxymethyl-6-propyl-3-(2,4-dimethyl-phenyl)-3,4-dihydro-pyrimidone-(4)-hydrochloride, melting point 180° C. (from isopropanol).

*Example 2*

(a) A solution of 200 grams of β-oxo-caproic acid-o-toluidide, melting point 64 to 66° C., in 600 cc. of methanol was mixed with 200 cc. of liquid ammonia and the mixture was kept for 24 hours at room temperature. The solvent was distilled off under reduced pressure, the residue was taken up in benzene and concentrated by evaporation, and the distillation with benzene was repeated. The so obtained crude 3-amino-hexenic-(2)-acid-(1)-o-toluidide was heated at the boil for 3 hours with 600 cc. of acetic acid anhydride. The excess acetic acid anhydride was then distilled off, the residue was dissolved in propanol and mixed with isopropanolic hydrochloric acid. There were obtained 112 grams of 2-methyl-6-propyl-3-o-tolyl-3,4-dihydro-pyrimidone-(4)-hydrochloride melting at 252° C. (decomposition) (from isopropanol).

(b) 50 grams of 3-amino-hexenic-(2)-acid-(1)-o-toluidide melting at 102–103° C. were dissolved in 200 cc. of acetic acid anhydride, and the solution was heated at the boil for 2 hours. The reaction solution was worked up according to the working method described in Example 2a. There were obtained 44 grams of 2-methyl-6-propyl - 3 - o - tolyl - 3,4 - dihydro - pyrimidone - (4)-hydrochloride melting at 252° C. (decomposition).

*Example 3*

(a) A solution of 23.1 grams of β-acetamino-crotonic acid-o-toluidide, melting point 141° C., in 200 cc. of xylene was mixed with 30.6 grams of acetic acid anhydride and the mixture was heated at the boil for 3 hours. The solvent was distilled off, and the residue was converted into the hydrochloride by means of isopropanolic hydrochloric acid. There were obtained 16 grams of 2,6-dimethyl - 3 - o - tolyl - 3,4 - dihydro - pyrimidone - (4)-hydrochloride melting at 280° C. (decomposition). The base on which the hydrochloride was based melted at 114° C.

(b) On heating for 15 minutes 5 grams of β-acetamino-crotonic acid-o-toluidide to about 200° C. and treating the melt after cooling with 20 cc. of a solution of hydrogen chloride in isopropanol of 5% strength, there were obtained 1.5 grams of 2,6-dimethyl-3-o-tolyl-3,4-dihydro-pyrimidone-(4)-hydrochloride melting at 280° C. (decomposition).

(c) The same compound (2.8 grams) was obtained by heating at the boil for 1 hour 23.1 grams of β-acetamino-crotonic acid-o-toluidide in 200 cc. of acetyl chloride, concentrating the reaction solution by evaporation and recrystallizing the residue from isopropanol.

(d) The same compound was obtained by introducing 14 grams of phosphorus pentoxide into a solution of 23.1 grams of β-acetamino-crotonic acid-o-toluidide in 200 cc. of toluene heated at 80° C. while stirring, and heating the mixture for 1 hour at the boil. The reaction mixture was stirred with an excess of dilute hydrochloric acid, the base was precipitated from the hydrochloric solution by means of potassium carbonate and separated with chloroform. 3.2 grams of hydrochloride melting at 280° C. (decomposition) were obtained from the base.

*Example 4*

A solution of 15.4 grams of 3-chlor-acetophenone-oxime in 250 cc. of chloroform was mixed, while being cooled with an ice/sodium chloride freezing mixture, with 20.5 grams of phosphorus pentachloride and stirred vigorously for some minutes. After keeping the reaction mixture for 3 hours at room temperature, it was concentrated to about 100 cc. in the water-jet vacuum, and the so obtained N-(m-chlorophenyl)-acetimide-chloride was slowly mixed, while stirring, with a solution of 31.5 grams of 3-amino-hexenic-(2)-acid-(1)-ethyl ester in 200 cc. of chloroform. After keeping the reaction mixture for 3 days at room temperature, it was heated at the boil for a further 2 hours and subsequently evaporated under reduced pressure. The residue was stirred up with excess dilute hydrochloric acid and benzene, the aqueous layer was separated and filtered off with suction by means of charcoal. The hydrochloric solution was rendered alkaline by means of potassium carbonate, and the precipitated base was separated by extraction with ether. The crude product was dissolved in ethanol and acidified with ethanolic hydrochloric acid. After inoculation and cooling in ice there were obtained 5.2 grams of 2-methyl-6-propyl - 3 - (m - chlorophenyl) - 3,4 - dihydro - pyrimidone-(4)-hydrochloride which melted at 241° C. with decomposition after recrystallization from ethanol.

We claim:

1. 2 - methoxymethyl - 6 - n - propyl - 3 - o - tolyl - 3,4-dihydro-pyrimidone-(4)-hydrochloride.

2. 2 - methyl - 6 - n - propyl - 3 - (3 - hydroxy - 4-carbethoxyphenyl) - 3,4 - dihydro - pyrimidone - (4)-hydrochloride.

References Cited by the Examiner

Staskun et al.: J. Chem. Soc., London (1956), pages 4708–10.

IRVING MARCUS, *Primary Examiner.*

WALTER A. MODANCE, *Examiner.*